United States Patent [19]

Schrader et al.

[11] Patent Number: 5,335,959
[45] Date of Patent: Aug. 9, 1994

[54] LINK ELEMENT OF VARIABLE EFFECTIVE SUPPORTING LENGTH FOR THE SPRING DRIVE OF A PIVOTING COMPONENT

[75] Inventors: Jürgen Schrader, Schönbuch; Martin Guckel, Wiernsheim; Klaus-Peter Claar, Gechingen, all of Fed. Rep. of Germany

[73] Assignee: Mercedes-Benz AG, Fed. Rep. of Germany

[21] Appl. No.: 925,054

[22] Filed: Aug. 5, 1992

[30] Foreign Application Priority Data

Aug. 7, 1991 [DE] Fed. Rep. of Germany ....... 4126114

[51] Int. Cl.⁵ .................................................. B60J 7/08
[52] U.S. Cl. ..................................... 296/108; 296/116
[58] Field of Search ............... 296/107, 116, 108, 117

[56] References Cited

U.S. PATENT DOCUMENTS

| 3,036,859 | 5/1962 | Adamski | 296/116 |
| 3,328,072 | 6/1967 | Adamski | 296/116 |
| 3,994,524 | 11/1976 | Lehman | 296/116 |

FOREIGN PATENT DOCUMENTS

| 89211 | 7/1937 | Fed. Rep. of Germany. |
| 651973 | 10/1937 | Fed. Rep. of Germany. |
| 396156 | 4/1909 | France. |
| 232044 | 4/1925 | United Kingdom. |
| 1039801 | 8/1966 | United Kingdom. |
| 1164165 | 9/1969 | United Kingdom. |
| 1182659 | 3/1970 | United Kingdom. |

Primary Examiner—David M. Mitchell
Assistant Examiner—Andrew C. Pike
Attorney, Agent, or Firm—Evenson, McKeown, Edwards & Lenahan

[57] ABSTRACT

The invention relates to a link element of variable effective supporting length for the spring drive of a pivoting component, especially for the pivoting drive of a structural member of a vehicle folding top, which is articulated at a distance from the pivot axis of the pivoting component at one end on the pivoting component and at its other end on a countercomponent. The link element comprises an accumulator spring which can expand, with a change of the supporting length, and which can be regenerated by means of a backward pivoting movement of the pivoting component. The link element comprises a rigid link which is articulated elastically on the connecting component via the accumulator spring, with the result that the effective supporting length is variable within narrow limits.

4 Claims, 3 Drawing Sheets

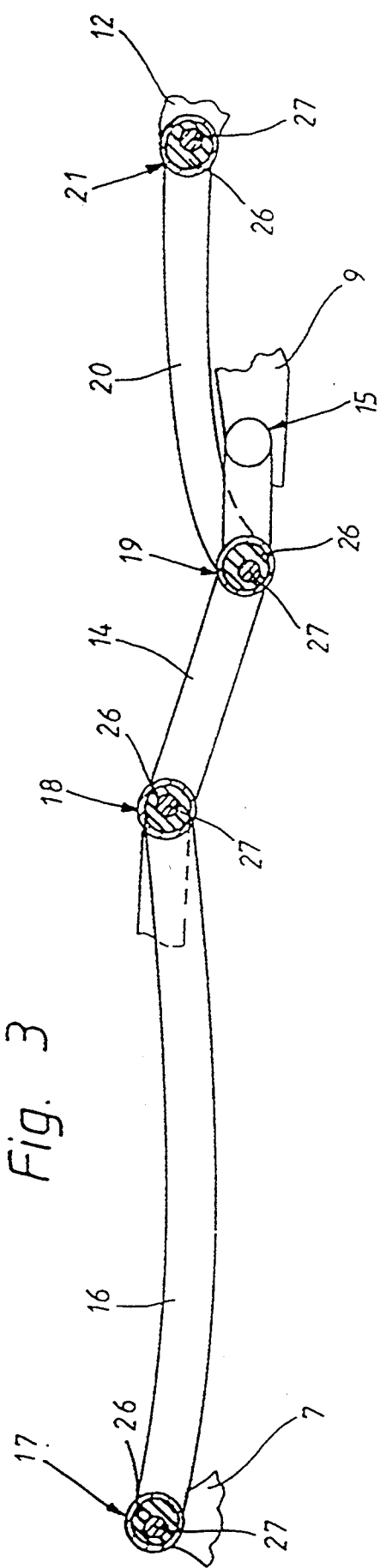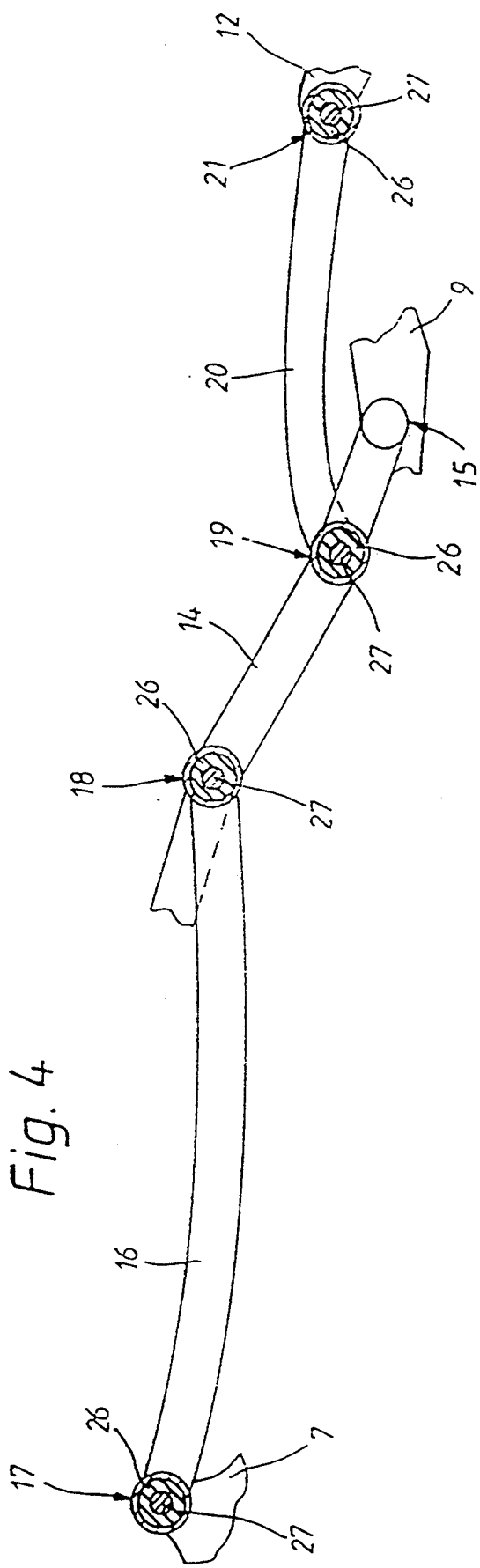

LINK ELEMENT OF VARIABLE EFFECTIVE SUPPORTING LENGTH FOR THE SPRING DRIVE OF A PIVOTING COMPONENT

BACKGROUND AND SUMMARY OF THE INVENTION

The invention relates to a link element of variable effective supporting length for the spring drive of a pivoting component, especially for the pivoting drive of a structural member of a vehicle folding top. The link element is articulated at a distance from the pivot axis of the pivoting component between the latter and a counter-component. The effective supporting length of the link element is variable during the pivoting of the pivoting component as a result of the deformation of an accumulator spring.

A link element of this type is to be taken as already known, for example, from German Patent Application G 89,211, wherein the link element is of variable length as a result of a telescopic design. Supported axially between the interacting telescopic tubes of the link element is a helical compression spring which is surrounded by the tubes and which serves as an accumulator spring for the spring-driven closing of the folding top. For this, one telescopic tube of the link element is articulated on a front roof-frame part and the other telescopic tube on a rear roof-frame part of a lateral roof frame which is designed as a two-part folding frame.

During the closing of the folding top, the link element lengthens as a result of the expansion movement of the accumulator spring, with the result that the front roof-frame part and consequently the entire front roof part is pivoted relative to the rear roof-frame part into an extended position occupied with the folding top closed.

Instead of the helical compression spring as an accumulator spring, alternatively, there is a tension spring, by means of which the folding top can be thrown open in a spring-driven manner, with the arrangement of the link element being unchanged. The front roof part would thus be pivoted upwards relative to the rear roof part in a first opening phase of the folding top.

The known link element involves a relatively high outlay in manufacturing terms and is therefore expensive to produce. Moreover, its telescopic design necessitates a considerable space for the arrangement and movement of the link element, and this will not be immediately available where many folding-top versions or other instances of use are concerned. This is all the more so because, by being articulated at both ends, the link element, although having the appearance of a link, nevertheless can no longer fulfill the function of a genuine link.

Furthermore, pivoting components which have to be spring-driven only through a relatively small pivoting angle are known.

As regards folding tops, attention is drawn in this respect to German Patent Specification 651,973 which discloses a folding top. The front roof part of the top is pivoted upwards in the first phase of the opening movement into a lifted-off intermediate position by means of a spring-accumulator drive, after which the folding top can be thrown open more easily. Here, the accumulator springs are two sleeve springs which are each integrated in a bush-like manner into an associated hinge joint between the front and rear roof-frame part of a lateral roof frame. These sleeve springs consist of an elastomeric material and act as turn and slide springs between a cylindrical inner and outer sleeve of the hinge joint. Radial stop means serve for limiting the driving pivot angle.

The sleeve springs provided as accumulator springs make it possible in a way advantageous per se to do without the use of link elements of variable length for the pivoting drive. On the other hand, the integration of the sleeve springs into the associated hinge joint presupposes a large-size joint design. Where folding tops having relatively slender roof frames or other pivoting components are concerned, the necessary installation space will not be directly available in terms of construction for a joint design of this type. Therefore, sleeve springs of the known type which are used as accumulator springs cannot be employed.

There is therefore needed the development of a link element of variable effective supporting level for the spring drive of a pivoting component of the relevant generic type, to the effect that although the pivoting component can be spring-driven by means of the link element, only over a relatively small deflection angle the kinematically movement-controlling link characteristic of a link component will be largely preserved.

The present invention meets these needs by a link element of variable effective supporting length for the spring drive of a pivoting component. The link element is articulated at a distance from the pivot axis of the pivoting component between the latter and a counter-component. The effective supporting length of the link element is variable during the pivoting of the pivoting component as a result of the deformation of an accumulator spring. With the link element being of constant length per se, the accumulator spring is formed by an elastic element located at the articulation on the pivoting component and/or counter-component. To regenerate the accumulator spring, the rigid link is displaced longitudinally relative to a bearing lug of the connecting component, the accumulator spring being correspondingly compressed.

To allow the articulation by means of accumulator springs of short spring excursion, the two ends of the link can be articulated by means of an accumulator spring, the spring excursions of which supplement one another.

Since the accumulator spring or the accumulator springs allow only a narrowly limited relative displacement of the link in relation to the bearing lug or the axial pin of the connecting component, the link element can advantageously replace a controlling link, necessary in any event, of an articulated parallelogram or the like.

If a parallelogram linkage comprises a plurality of parallelogram-like four-bar mechanisms which are arranged in succession in the manner of a scissor mechanism, each of the four-bar mechanisms can have a control link designed as a link element of variable length. Since the spring excursions of the accumulator springs used on all the control links are added together, a relatively long total spring excursion is brought about even with the use of accumulator springs which each have a short spring excursion.

The accumulator spring preferably consists of a radially elastic sleeve spring, for example made of rubber, which is arranged in a similar way to that of a bearing bush. Such sleeve springs can be produced cost-effectively. Furthermore, compression of such sleeve springs in any radial direction is possible.

To drive the pivoting component out of one of its end positions, the constructive supporting length of the link element appropriately differs from the non-loaded supporting length of the link element to such an extent that the accumulator spring or the accumulator springs are exactly regenerated in the end position of the pivoting component. Undesirable overstretching of the accumulator springs can thereby be reliably prevented.

By means of a mirror-symmetric arrangement of a plurality of link elements in the parallelogram linkage of a folding-top structure, a front roof part of a folding top can be driven in a simple way into an upwardly pivoted intermediate position and held automatically in this position.

Other objects, advantages and novel features of the present invention will become apparent from the following detailed description of the invention when considered in conjunction with the accompanying drawings.

BRIEF DESCRIPTION OF THE DRAWINGS

FIG. 3 is a vertical longitudinal section view through the links controlling the front roof-frame part, with the folding top closed; and FIG. 4 is a vertical longitudinal section view through the links controlling the front roof-frame part, after the first phase of the opening movement.

DETAILED DESCRIPTION OF THE DRAWINGS

Figure 1:
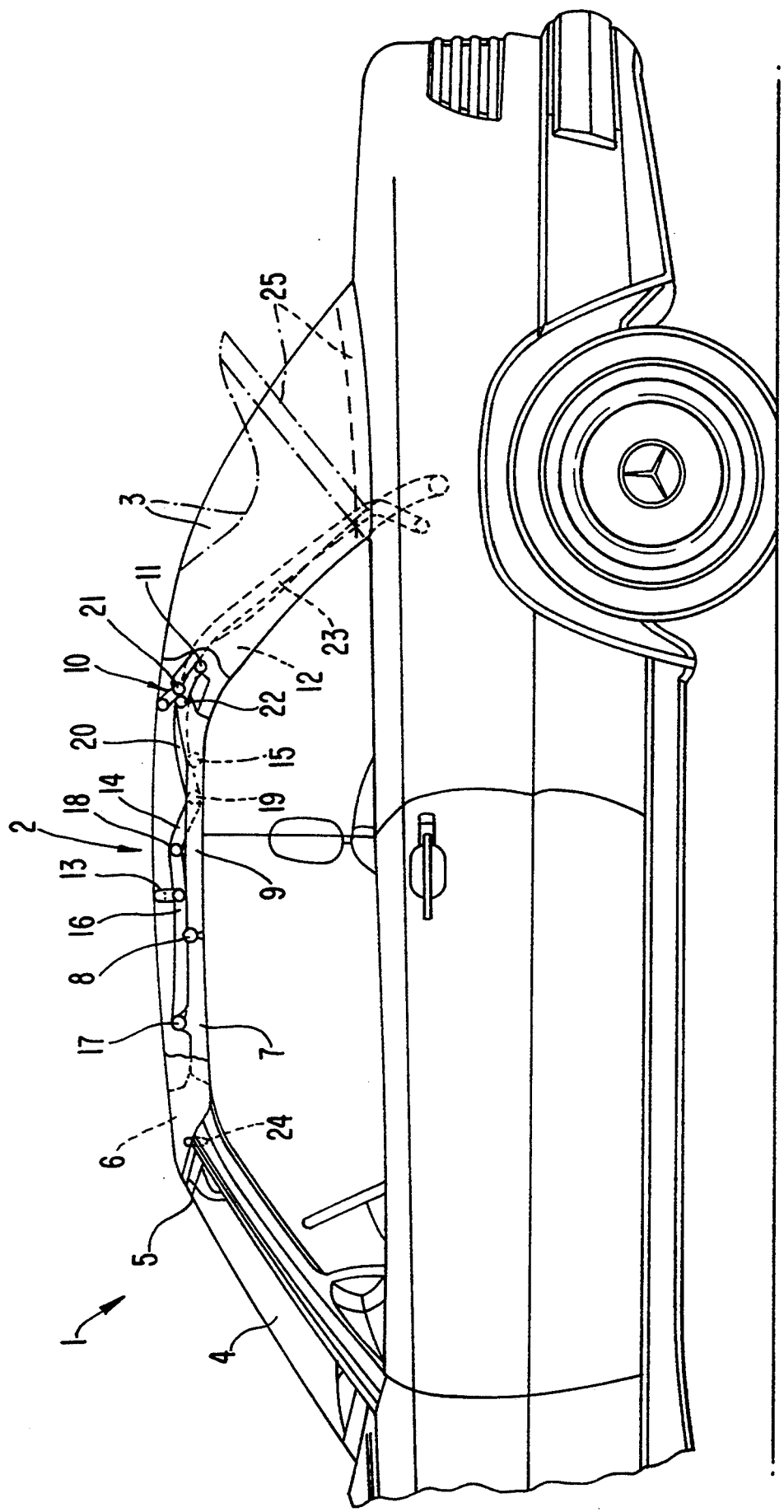
FIG. 1 is a side view of a closed folding top, according to the present invention, on a motor vehicle.

A convertible vehicle 1, which can be seen in FIG. 1, is equipped with a folding top 2 which comprises in the conventional manner a supporting folding-top structure and a folding-top covering 3 stretched out over the folding-top structure and made of textile material and which, in the closed state, covers the interior of the convertible 1. In a region located above the side windows of the convertible 1, the folding-top covering 3 is shown cut away, thereby revealing the upper structural parts of the folding top 2 on the left-hand side of the vehicle which are mirror-symmetrical to the structural parts on the right-hand side of the vehicle not visible in FIG. 1.

On a body frame 5 arranged above the windscreen 4 rests a roof cap 6 which extends over the entire roof width and which, with the folding top 2 closed, is interlocked with the body frame 5 at two points by means of front folding-top fastenings. This retains the folding-top covering 3 at the front of the convertible 1. The lateral limiting faces of the roof cap 6 each merge into a front roof-part 7 which is fastened immovably to the roof cap 6 and which extends rearwards in the longitudinal direction of the vehicle, running above the side window of the convertible 1. A front part of the folding top 2 is thus limited on three circumferential sides by supporting structural parts.

The rear ends of the roof-frame parts 7 are each connected via a hinge joint 8 to the front end of a rear roof-frame part 9 which extends the lateral roof frame as far as a main bow 10 and which is secured at its rear end via a hinge joint 11 to the associated folding-top column 12 of the main bow 10. A folding-top part adjoining the front part of the folding top 2 is thus likewise limited on three circumferential sides by supporting structural parts, namely by the middle tube of the main bow 10 and the two roof-frame parts 9.

For the intermediate support of the folding-top covering 3 stretched between the middle tube of the main bow 10 and the roof cap 6, there is an intermediate bow 13 which bears on the underside of the folding-top covering 3. The intermediate bow 13 is held by bow levers 14 which are connected to its lateral ends and which extend obliquely rearwards and downwards and are secured at their rear end, approximately in the longitudinal center of the roof-frame parts 9, to the associated roof-frame part 9 via respective hinge joints 15. The intermediate bow 13 is held in its constructional position by lateral coupling links 16, the front end of each of which is connected via a hinge joint 17 to a middle region of the associated roof-frame parts 7 and the rear end of which is connected via a hinge joint 18 to a middle region of the associated bow lever 14. At a distance behind the hinge joint 18, the bow levers 14 have a further hinge joint 19, to which a front end of a roof-frame link 20 is connected. Starting from the hinge joint 19, the roof-frame link 20 extends obliquely rearwards and upwards as far as the folding-top column 12, where it is connected to the latter via a hinge joint 21. At a distance in front of the hinge joint 11, a main link 23 engages on the rear roof-frame part 9 via a further hinge joint 22 and is articulated at its lower end on the body at a corresponding distance in front of the main bearing of the folding-top column 12.

The side-wall structural parts of the folding top 2 are thus respectively connected to one another to form a bar transmission comprising a plurality of parallelogram-like four-bar mechanisms, thereby guaranteeing a positive kinematic movement of the folding-top structure in dependence on the backward pivoting movement of the main bow 10.

Figure 2:
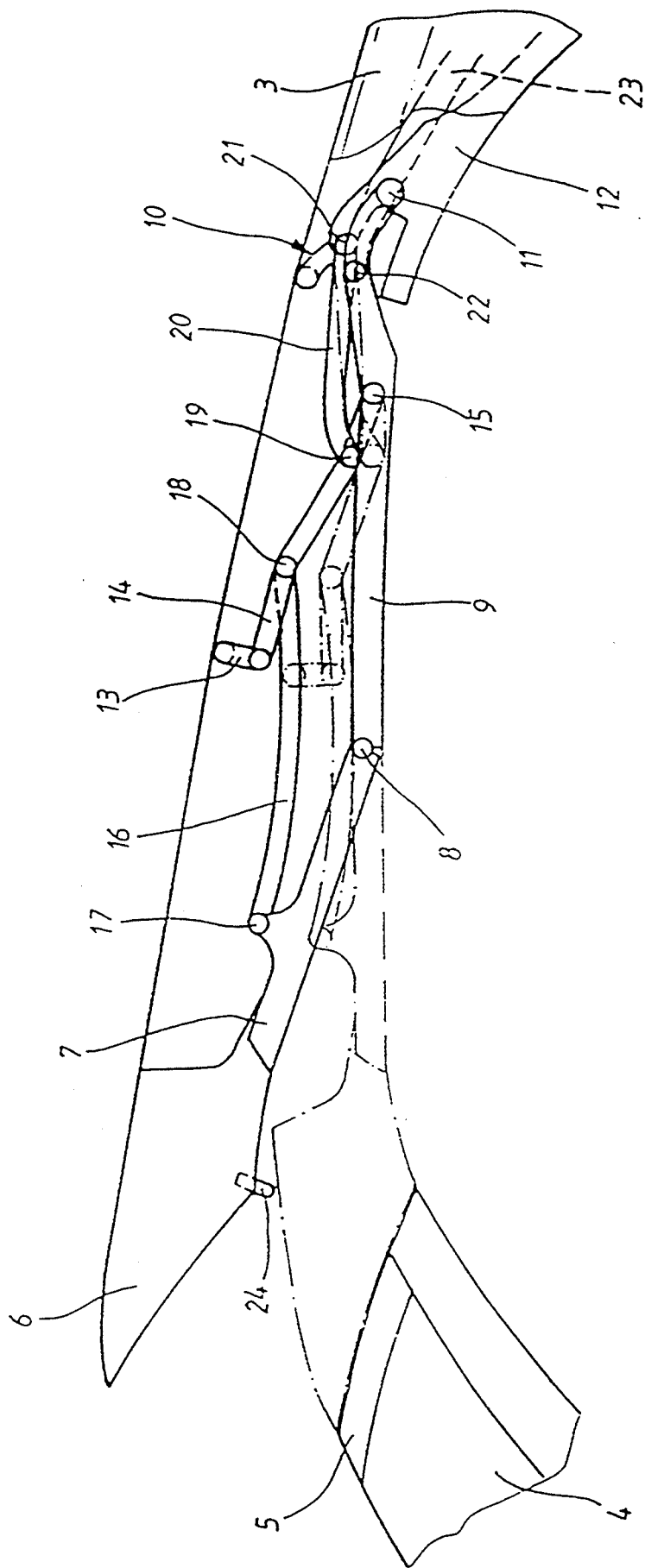
FIG. 2 illustrates the folding top of the present invention after a first phase of the opening movement.

Referring to FIG. 2, to throw open the folding top 2, first the front folding-top fastenings of a type known and therefore not shown have to be released, after which the roof cap 6, from the underside of which projects the fastening pegs 24 interacting with the fastenings, can be lifted off from the body frame 5. When the roof cap 6 is being lifted off, the front folding-top part pivots upwards about the geometrical axis of the hinge joints 8, an appreciable lifting force initially having to be exerted.

If the folding top 2 also has a pivotable cloth-holding strap 25 which, forming the lower end of the folding top 2, retains the folding-top covering 3 and which, when the folding top 2 is being closed, has to be pivoted down into a resting position on a kept-shut folding-top box lid not shown, in order to allow interlocking with the folding-top box lid, the downward pivoting of the cloth-holding strap 25 may be impeded because the roof cap 6 retaining the folding-top covering 3 at the front is already interlocked with the body frame 5. This is true of all folding-top versions in which, in the last phase of the closing movement, the folding-top covering is to be stretched over the front folding-top part swinging downwards. So that this can be reliably guaranteed, the endeavor is to ensure that, during the closing of the folding top 2, the roof cap 6 is held in an intermediate position, in which it does not yet exert any tension forces on the folding-top covering 3 in a longitudinal direction of the folding top.

To ensure that the ease of operation for opening the folding top 2 is improved and, if appropriate at the same time the tensioning sequence of the folding-top covering 3 is safeguarded, after the release of the front folding-top fastenings the front folding-top part is automatically pivoted upwards into a lifted-off intermediate position by means of a spring-accumulator drive and held in this position. The spring-accumulator drive is integrated in a space-saving and inconspicuous way into the hinge joints 17 and 18 of the coupling link 16 and the hinge joints 19 and 21 of the roof-frame link 20 which are thus arranged in pairs on both sides of the vehicle.

As can be seen in FIGS. 3 and 4, the four accumulator springs on each side of the vehicle each consist of a radially elastic sleeve spring 26, for example made of rubber or an elastomeric plastic, the outer circumference of which is supported on the inner circumference of a bearing lug and the inner circumference of which is supported on the outer circumference of an axial pin 27 passing with an exact fit through its middle bore. The two axial pins 27 of the coupling link 16 and those of the roof-frame link 20 are arranged on the associated connecting component here, whilst the bearing lugs are connected immovably to one another via the coupling link 16 or the roof-frame link 20. However, it would also be possible, alternatively, to reverse the operating principle, that is to say arrange the bearing lugs on the associated connecting component and design the two ends of the coupling link 16 and of the roof-frame link 20 as angled axle pins. It is essential for the intended function merely that the two ends of the coupling link 16 and of the roof-frame 20 be articulated on the associated connecting component via a radially elastic sleeve spring 26.

Although the coupling link 16 and the roof-frame link 20 are rigid per se, their effective supporting length is variable within narrow limits as a result of the elastic articulation of their ends, and because of this the parallelogram-like four-bar mechanisms limited by the hinge joints 8, 15, 17, 18 an 11, 15, 19, 21 can also be varied in a controlled manner in their four-bar geometry by means of a change of the supporting length of the coupling link 16 or of the roof-frame link 20. It goes without saying that the hinge joints 8, 11 and 15 are inelastic pivot bearings, the bearing lug of which surrounds the associated axle pin with little radial play.

So that an equidirectional change of the effective supporting length of the two controlling links 16 and 20 has the supplementary effect of a pivoting advance on the front roof-frame part 7, the four-bar mechanisms limited by the hinged joints 8, 15, 17, 18 and 11, 15, 19, 21 are arranged in succession, the coupling link 16 being coupled to the roof-frame link 20 via the bow lever 14 secured to the common hinge joint 15. A kinematic linkage in the manner of a scissor-type lever mechanism is thus provided.

So that, with the folding top 2 closed, the sleeve springs 26 have accumulated the necessary expansion energy, that is to say are regenerated, the constructive supporting length of the coupling link 16 and of the roof-frame link 20 differs in a controlled manner from their non-loaded supporting length.

This difference is achieved in that the center distance between the two axle pins 27 of the coupling link 16 or the center distance between the two axle pins 27 of the roof-frame link 20 is respectively greater by the amount of the intended spring excursion of the two sleeve springs 26 than the center distance of the associated bearing lugs, that is to say between the bearing lugs of the hinge joints 17 and 18 or 19 and 21.

Moreover, the spring characteristic of the sleeve springs 26 is selected so that, with the hinge joints 17, 18, 19 and 21 largely non-loaded, the axle pin 27 is held by the sleeve spring 26 in virtually central mid-position in the associated bearing lug. Here, the hinge joints 17, 18, 19 and 21 are largely non-loaded when the front folding-top part is pivoted upwards through approximately 20° as can be seen in FIG. 4.

It is thus possible to swing the front folding-top part down to lock the roof cap 6 on the body frame 5 only by overcoming the restoring forces of the sleeve springs 26, since the axle pins 27 are at the same time displaced into an eccentric position in the bearing lug, as can be seen in FIG. 3. The displacement of the axle pins 27 in their radial direction is necessarily accompanied by a radial contraction of a circumferential portion of the sleeve springs 26, by means of which with the folding top 2 closed, the sleeve springs 26 are prestressed to the maximum extent. This process of accumulating kinetic energy, although inhibiting the folding movement of the roof-frame part 7 about the hinge joint 8, is nevertheless on the other hand made easier by toggle-lever effects which are brought about by the increasingly extended parallelogram geometry.

With the roof cap 6 unlocked and therefore released, the axle pins 27 are instantaneously forced back increasingly into their central mid-position by the restoring forces of the sleeve springs 26, with the result that the front roof-frame part 7 is driven into its lifted-off intermediate position and at the same time is supported in a manner inhibiting any renewed downswing.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A device for pivotally driving a structural member of a vehicle folding top, said vehicle folding top having a pivoting component and a counter-component, comprising:
   a plurality of parallelogram-like four-bar mechanisms arranged in succession for driving said pivoting component in the manner of a scissor-type lever mechanism, said plurality of parallelogram-like four-bar mechanisms including:
   a link element, forming a control link for the four-bar mechanisms, having a variable effective supporting length for the folding top, said link element being articulated at a distance from a pivot axis of the pivoting component between said pivoting component and said counter-component; and
   an accumulator spring allowing for variation of the effective supporting length during pivoting of said pivoting component as a result of deformation of said accumulator spring;
   wherein said accumulator spring is formed by a sleeve spring, made of an elastomeric material, providing a radially elastic element located at at least one of a hinge joint on said pivoting component and said counter-component.

2. A device according to claim 1, wherein the sleeve spring is supported with its outer circumference on the inner circumference of a bearing lug and with its inner circumference on the outer circumference of an axle pin passing through it, and, with the hinge joint being non-loaded, the axle pin is held by the sleeve spring in a substantially central mid-position.

3. A device according to claim 1, wherein the accumulator spring is regenerated in one end position of the pivoting component, for which purpose the constructive supporting length of the link element differs from the non-loading supporting length of the link element.

4. A device according to claim 3, wherein the pivoting component is a front folding-top part of the folding top which comprises as structural members a front roof cap and lateral roof-frame parts connected to the front-frame cap, and in that, in a first opening phase of the folding top, the front folding-top part is driven into an upwardly pivoted intermediate position by means of a mirror-symmetric arrangement of a plurality of said link elements.

* * * * *